United States Patent
Goodwin

(10) Patent No.: US 7,528,315 B2
(45) Date of Patent: May 5, 2009

(54) RHYTHM ACTION GAME APPARATUS AND METHOD

(75) Inventor: Simon Nicholas Goodwin, Warwick (GB)

(73) Assignee: Codemasters Software Company Limited (GB)

( * ) Notice: Subject to any disclaimer, the term of this patent is extended or adjusted under 35 U.S.C. 154(b) by 0 days.

(21) Appl. No.: 11/417,227

(22) Filed: May 3, 2006

(65) Prior Publication Data

US 2006/0266200 A1    Nov. 30, 2006

(30) Foreign Application Priority Data

May 3, 2005    (GB)    .................... 0508970.1

(51) Int. Cl.
*G10H 1/40*    (2006.01)
*A63F 9/24*    (2006.01)

(52) U.S. Cl. ............................. 84/611; 463/7

(58) Field of Classification Search .......... 463/7, 463/23; 434/250, 307 A; 84/611, 635, 651, 84/667, 713
See application file for complete search history.

(56) References Cited

U.S. PATENT DOCUMENTS

| | | | |
|---|---|---|---|
| 5,614,687 A * | 3/1997 | Yamada et al. ................ 84/662 |
| 6,001,013 A | 12/1999 | Ota | |
| 6,227,968 B1 | 5/2001 | Suzuki et al. | |
| 6,390,923 B1 * | 5/2002 | Yoshitomi et al. ............. 463/43 |
| 6,433,267 B2 * | 8/2002 | Park et al. ...................... 84/611 |
| 6,448,483 B1 * | 9/2002 | Loo et al. ................. 84/464 R |
| 6,694,035 B1 * | 2/2004 | Teicher et al. ............... 381/326 |
| 6,758,756 B1 | 7/2004 | Horigami et al. | |
| 6,787,689 B1 * | 9/2004 | Chen .......................... 84/600 |
| 2001/0014620 A1 | 8/2001 | Nobe et al. | |
| 2001/0016510 A1 * | 8/2001 | Ishikawa et al. ............... 463/7 |
| 2002/0178410 A1 * | 11/2002 | Haitsma et al. ............. 714/709 |

* cited by examiner

*Primary Examiner*—Walter Benson
*Assistant Examiner*—Andrew R Millikin
(74) *Attorney, Agent, or Firm*—Chapin IP Law, LLC; Barry W. Chapin, Esq.

(57) ABSTRACT

A rhythm action game apparatus comprising an audio analyzer adapted to analyze a music track and provide corresponding rhythm data, and a sequence generator adapted to generate game play cues according to said rhythm data. There is also disclosed a music processor comprising an audio analyzer adapted to analyze a music track and provide corresponding rhythm data, and an audio post processor adapted to reconfigure the music track controlled by the rhythm data.

26 Claims, 8 Drawing Sheets

RHYTHM ACTION GAME APPARATUS AND METHOD

CROSS REFERENCE TO RELATED APPLICATIONS

This Patent Application claims priority to United Kingdom Patent Application No. 0508970.1 filed on May 3, 2005, entitled, "RHYTHM ACTION GAME APPARATUS AND METHOD", the contents and teachings of which are hereby incorporated by reference in their entirety.

FIELD OF INVENTION

The present invention relates to rhythm action games, and in particular, to rhythm action games capable of detecting the beats within an arbitrary music track chosen by a user and providing a suitable sequence of cues for response based on the detected beats.

BACKGROUND OF THE INVENTION

Known rhythm action games, otherwise known as dance mat games, have up to the present time used pre-selected music tracks. By using such pre-selected music tracks, the dance cue sequences used within the game can be designed specifically for each music track, and associated with the music track, ready for scanning at the same time as the music is streamed for playback.

In some cases, the developer might create a number of different sequences for a particular track, the choice of which dance cue sequence to use when playing the game being either up to the player directly by being dependent upon the difficulty setting selected, else indirectly, for instance dependent on the player's past performance.

Furthermore, some rhythm action games use music that is especially made for the game itself, often by use of a software sequencer, therefore the developer has access to accurate beat sequences for the particular tracks used which significantly aids the development of a suitable dance cue sequence.

However, there is often a desire by the player of such games to be able to use their own specific choice of music, and more specifically the use of the latest popular music track of that time. Up until now, this was not possible due to the fixed nature of the music tracks within all previous rhythm action games.

SUMMARY OF THE INVENTION

The invention addresses these and other problems and limitations of the related prior art.

Generally, the invention provides a rhythm action game apparatus adapted to analyze an audio signal provided by a user and to generate a sequence of cues for responses on the basis of that analysis. The invention also, in general, provides a method of producing cues for responses in a rhythm action game, comprising analysing a music track to provide rhythm data corresponding to detected beats within the music and generating a sequence of game play cues for response according to said rhythm data.

More particularly, the invention provides a rhythm action game apparatus, comprising an audio analyser adapted to analyze a music track and provide corresponding rhythm data and a sequence generator adapted to generate game play cues according to said rhythm data.

The invention also provides a music processor comprising an equivalent audio analyser adapted to analyze a music track and provide corresponding rhythm data and an audio post processor adapted to reconfigure the music track controlled by the rhythm data. This music processor may then be used within a rhythm action game, for example, to indicate success in a task to a user.

The invention also provides a computer readable medium, such as a DVD-ROM, CD-ROM, game cartridge, static memory card, or the like, carrying computer program code adapted to provide equivalent functions of apparatus described. The computer program code, when executed on a suitably equipped computer hardware device, such as a personal computer or game console, carries out the described functions using attached peripheral devices, such as controllers and cameras.

The invention also provides corresponding methods of operating such computer equipment.

In any of the above cases, preferably the audio analyser further comprises at least one beat detector.

In any of the above cases, preferably each beat detector further comprises at least one frequency filter adapted to provide a filtered portion of said music track by isolating a predetermined frequency band of said music track.

In any of the above cases, preferably the at least one frequency filter is an Infinite Impulse Response filter.

Preferably, the beat detector further comprises a beat resonator adapted to detect beats within the filtered portion of the music track and to determine a beat period of the detected beats of the filtered portion of the music track.

Preferably, the beat resonator is further adapted to detect a phase difference between the detected beat period and further successive detected beats within the filtered portion of the music track.

Preferably, the beat resonator is further adapted to provide a confidence factor, said confidence factor being indicative of the correlation between the detected beat period and further successive detected beats within the filtered portion of the music track.

Preferably, the beat resonator further comprises a phase locked loop.

Preferably the audio detector further comprises a plurality of beat detectors.

Preferably, the audio analyser further comprises at least one section detector, said section detector being adapted to detect discrete sections within the music track.

Also preferably, the section detectors detect sections using the confidence factor of the at least one beat resonator.

Alternatively or additionally, the section detectors may detect sections using the direct output of a frequency filter.

Preferably, the audio analyser further comprises a correlator, adapted to provide a plurality of outputs for use in generating a dance or other sequence of cues for response, dependent upon weighted values of the outputs of the plurality of beat detectors and the at least one section detector.

Preferably, the correlator further comprises a neural network.

Preferably, the rhythm action game apparatus further comprises a dance controller, adapted to alter parameters of the at least one beat detector dependent upon the plurality of outputs from the correlator.

Preferably, the rhythm action game apparatus further comprises a memory adapted to store predetermined dance data, and wherein the sequence generator generates cues for responses from said dance data stored in said memory according to said rhythm data.

Preferably, the rhythm action game apparatus further comprises an audio input device, for supplying music tracks to said audio analyser for analysis.

Preferably, the rhythm action game apparatus further comprises an audio pre-processor, adapted to process the music track prior to input into the beat detectors.

Preferably, the audio pre-processor processes the music track to produce a delta wave output corresponding to the difference between a left and a right stereo channel of said music track.

Preferably, the rhythm action game apparatus further comprises an input device adapted to detect inputs from a user and a comparator, adapted to compare said input from a user with the generated cues for responses and provide an output dependent upon the difference between the two.

Preferably, the rhythm action game apparatus further comprises an audio post processor adapted to reconfigure the music track controlled by the rhythm data in response to the comparison of the input data with the generated cues for responses.

Preferably, the audio post processor filters the left and right stereo channels to produce a rotating sound field.

Preferably, the rhythm action game apparatus further comprises means for detecting an unique identification parameter of said music track and a static memory for storing said unique identification parameter.

Preferably, the rhythm action game apparatus further comprises an identification comparator, adapted to compare a plurality of stored unique identification parameters with a detected unique identification parameter of a selected music track.

Preferably, the unique identification parameter is any one of a checksum of a music track data file, a hash value derived from a table of contents of a source medium containing the music track, or a catalogue number embedded in said source medium.

The invention also provides a music processing system comprising an audio analyser, adapted to analyze a music track and provide corresponding rhythm data, wherein the audio analyser comprises at least one Infinite Impulse Response filter, a resonator uniquely associated with a one of the at least one frequency filter, and a correlator for providing rhythm data on the basis of the outputs of the frequency filters and resonators.

The above preferred features of the rhythm action game apparatus are also applicable to the other apparatuses provided by the invention.

The present invention makes use of information about the beats and other periodic characteristics in a selected audio signal to select and synchronise cue sequences in time with the audio. A cue sequence is a pattern of cues for responses on the part of the player. The responses are typically in the form of indicated button presses, joystick directions or other discrete inputs capable of being made on some sort of controller, camera or other type of input device that is attached to the gaming device.

Whilst the following description is described in terms of a dance mat game played in time to a musical track, the invention may equally be applied to any audio input signal with regular components capable of being detected, in combination with any form of input from which signals can be correlated with the result of the audio analysis. Regular components of an audio signal include beats, individual instrument noises, sections of a song, bars and the like.

All rhythm action games hitherto have been limited to working only with music that has been provided with the rhythm action game, and stored together on the same medium. The present invention seeks to enable rhythm action games to work with any music or other audio signals that the player wishes to use. The present invention, therefore, seeks unique and repeatable sets of patterns of cues for responses, corresponding to a given track, depending upon the settings chosen by the player.

When the selected music track is played, the invention compares patterns generated in response to periodic structures detected within the music track with responses, such as button presses, movements detected by a camera or mat or similar input device, to measure player performance for the purpose of entertainment, training, exercise or testing (for example, for the training/testing of reactions or fitness). The results of this comparison are used to indicate how successful the player has been, for example by changes to a score or delivery of some proportional reward in the form of sounds, graphics changes, or similar feedback to the player.

Whilst the preferred embodiment is described in terms of using music tracks derived from a music Compact Disc (CD), other embodiments may make use of music information derived from such sources as DVD media, Super Audio discs (SACD), MP3s, digitally captured analogue sources, directly streamed music information or any other equivalent source that is capable of providing audio signals for playing music, and in particular, repeatable audio signals.

Rhythm action games are typically played using dedicated dance mat input hardware, incorporating switching points activated by the pressure exerted by a player when they place a body part, for example a foot, on the switching point during a dance sequence. These dedicated dance mat input hardware devices are well known in the art and their description will not be expanded upon here. However, it is to be noted that in the absence of such dedicated dance mat input hardware, the player may also utilise a standard controller, with each button mapped to an equivalent active switching point on the dedicated dance mat, else use a video camera as an input device, with portions of the video capture area or gestures detected by a motion detection system being equivalent to button presses when movement is detected within that area. Furthermore, a standard controller, a video camera, or both may be used in conjunction with a dedicated hardware mat to allow a greater combination of button or active switch point combinations, to thereby increase the complexity of a dance game.

BRIEF DESCRIPTION OF THE DRAWINGS

The present invention may be put into practice in a number of ways. Some embodiments will now be described, by way of example only, and with reference to the accompanying drawings, in which.

DETAILED DESCRIPTION

Figure 1:
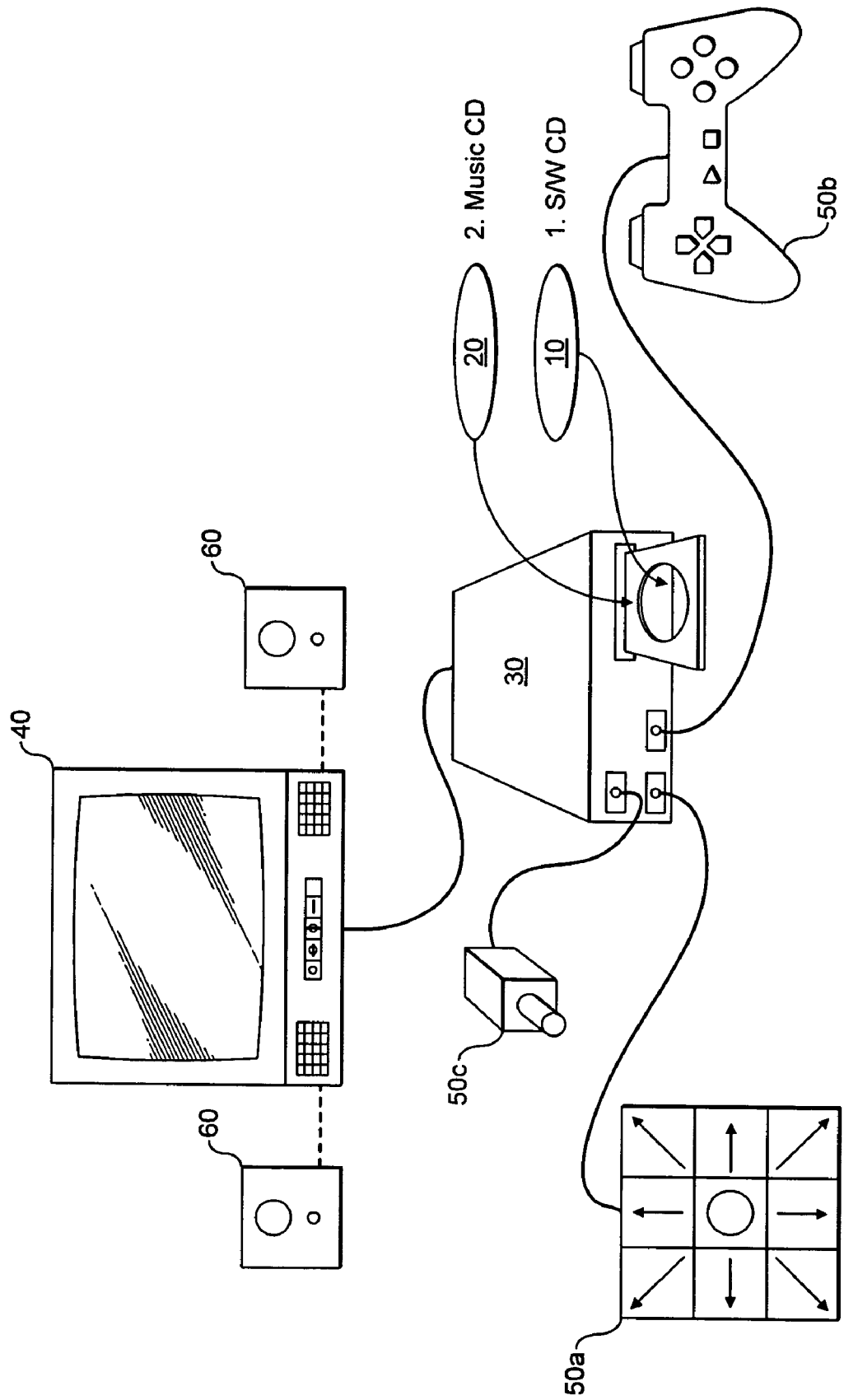
FIG. 1 shows an overall view of a system suitable for putting an embodiment of the present invention into practice.

FIG. 1 shows the setup of a typical system for putting the present invention into practice.

In the preferred embodiment, a computer readable medium 10, containing the program code embodying the invention, is loaded into a suitable generic computer hardware device 30. However, in other embodiments, the computer hardware device 30 may be dedicated to the running of the rhythm action game, with the software for running the program being stored in an embedded memory or other suitable storage medium. Equally the invention may be put into practice using dedicated electronics hardware, such as specifically programmed microprocessors together with other requisite electronic components or a combination of discrete analogue and digital components.

The computer hardware device 30 of FIG. 1 loads the software in the known way, storing the necessary computer code into a dynamic memory 130, for later processing by the microprocessors within the computer hardware device 30. Typically, the computer hardware 30 will be a console, containing, amongst other things, static memory, dynamic memory and microprocessors for handling the audio and video generated during game play and inputs from input devices 50 and 60.

Once loaded, the program disc 10 containing the software component of the rhythm action game may be removed and replaced by a music CD 20 containing the music tracks the player wishes to use within the rhythm action game. The program disc 10 may also contain some music tracks to allow instant game play in the absence of the user's own music CD 20 at the time of play.

In the case of a dedicated hardware rhythm action game only the music CD 20 needs to be loaded, since the computer program code is loaded directly from the static memory of the dedicated device, else where dedicated electronics hardware is used, it is usually capable of operating instantly from first switch on.

The computer hardware device 30 is connected to a video display device 40, for displaying the cue sequence and any associated in-game graphics. The video display device may also include an audio playback capability, thereby becoming an audio and video display device 40. Equally, the computer hardware device 30 may be connected to dedicated audio output devices, such as amplified speakers 60 for playing back the selected music track at an improved fidelity level. The audio that is played back during the execution of the rhythm action game may also include further audio cues or other effects either overlaid over the music track, or in place of the music track for selected periods of the game.

Input devices 50 are also connected to the computer hardware device 30. These can be in the form of a dedicated dance mat device 50a, a standard controller 50b, a video camera 50c, or a combination thereof.

Figure 2:
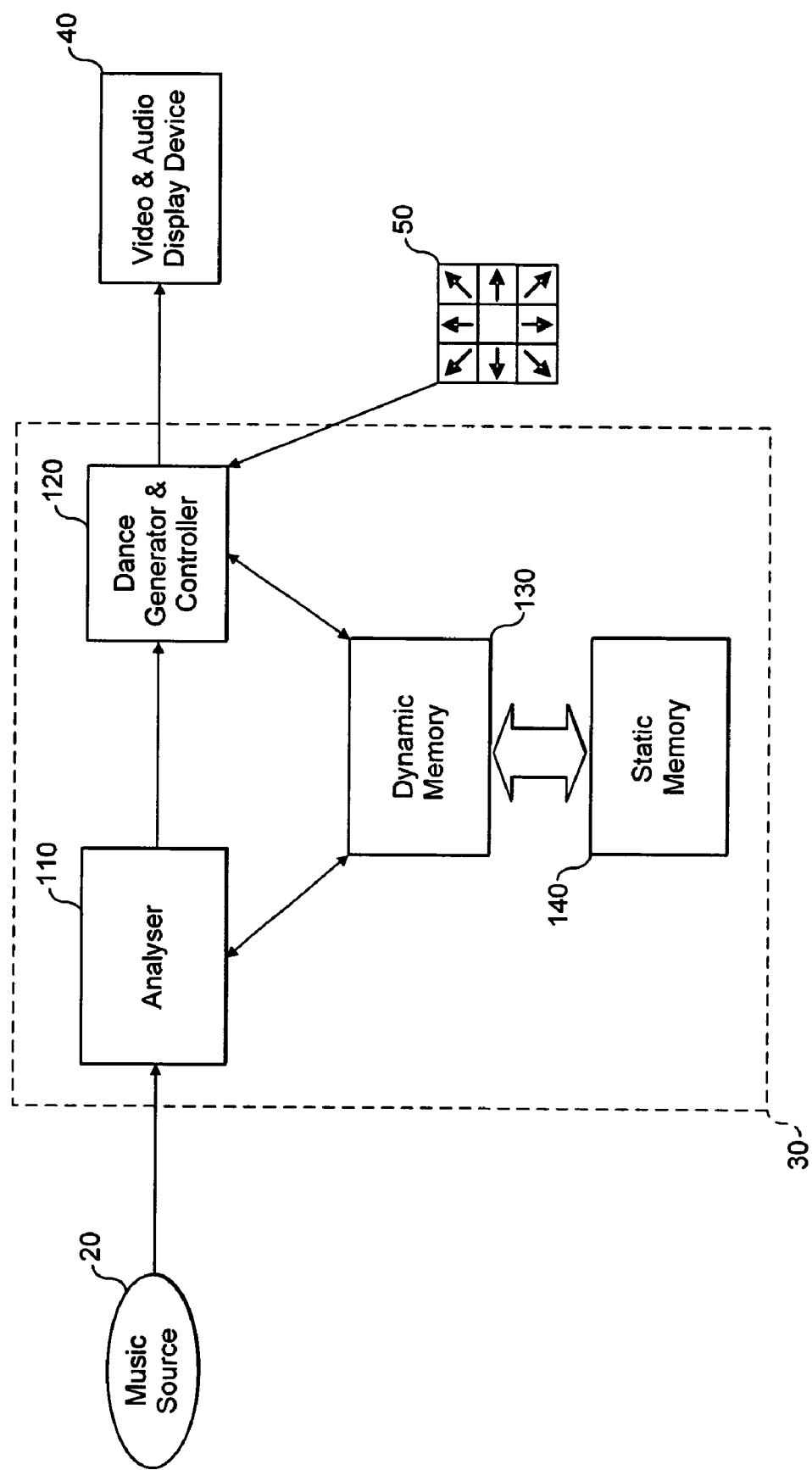
FIG. 2 shows a high level schematic of the component parts of a system according to the present invention.

FIG. 2 shows a high level schematic of the principal parts of a system according to a preferred embodiment of the invention.

In this preferred embodiment, the music track used during operation of the rhythm action game is derived from a music CD 20 placed within an optical disc drive contained within the computer hardware device 30. The optical disc drive may any of the currently available types, such as a CD drive, DVD drive, or the like. Typically, the music CD 20 used will contain a number of different tracks, with only some or all of the music tracks being used with the rhythm action game. Selection of which tracks to use is done by the player, using a selection screen within a menu system accompanying the game.

The music tracks selected for use with the rhythm action game are analysed by an analyser 110. The analyser 110 incorporates beat detection components, for detecting beats within the track, as well as ancillary information such as frequency, amplitude, phase differences between different beats and the like. The analyser 110 may also include section detection components for detecting transitions between sections within the music track. A section of a music track is a contiguous part of the input music track, such as the introduction, verse, chorus, middle 8, bridge or finale of the song.

The analyser 110 may also incorporate an ability to detect a unique characteristic of the selected track on the inserted music disc 20, for storage in a static memory 140. This unique characteristic may be stored together with any generated data for that disc or track, such as a generated cue sequence. This enables the system to recall previously derived data to reduce load times, to allow consistency within the game over non-consecutive plays, to call up pre-computed dances or cue sequences which may have been manually optimised to enhance play, and the ability to move cue sequences between similar devices 30 capable of playing the rhythm action game, for such things as competitive play between friends.

The above information may also be stored in the dynamic memory 130 for quick access during the current instance of the game, in non-volatile memory within the console such as a hard drive, else stored in a network database, separate from the computer device 30 but remotely contactable via any available networking protocol.

The output of the analyser 110 is fed into a dance generator and controller 120 which includes a cue sequence generator. The sequence generator creates the cue sequences using pre-defined cue components stored in the dynamic memory 130, derived from the original game disc 10, utilising the output of the analyser 110 to choreograph the sequence in time with the music track being played.

The generated sequences of cues for response are then outputted to the video and display device 40, for display to the user, who in turn reacts to these cues with inputs being made via the input device 50.

Figure 3:
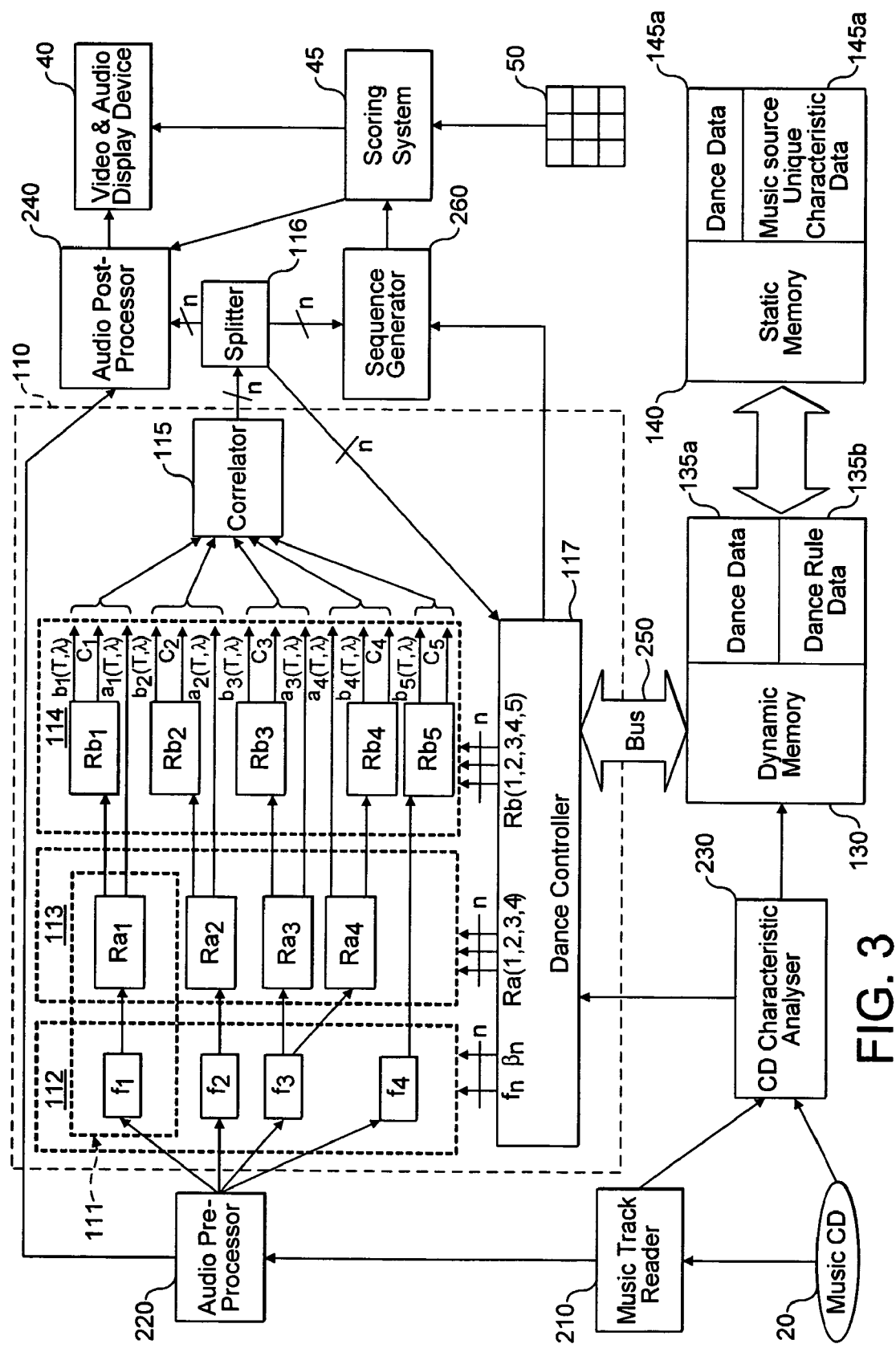
FIG. 3 shows a more detailed schematic of the overall system of FIG. 2.

FIG. 3 shows a more detailed view of the component parts of the system according to the present invention. In particular, there is shown a more detailed view of the analyser 110 of FIG. 2. In the example shown, only three beat detectors 111 are shown for simplicity.

The beat detection portion of the analyser 110 consists of a number of individual beat detectors 111, each providing inputs to a correlator 115 and a section resonator 114. The correlator 115 uses the outputs from the beat detectors 111 and section resonators 114 to provide the necessary information for the sequence generator 260 to decide on a suitable cue sequence to provide to the user during game play. The cue sequence is created using pre-defined modular components of a dance that are combined to form the sequence as a whole.

Each beat detector 111 consists of a frequency filter 112 and beat resonator 113. The frequency filters 112 are band-pass filters that allow a portion of the music signal through to the resonators 113 at a predetermined frequency and bandwidth. These serve to isolate the frequency bands of interest, which are the frequency bands containing the rhythmic components of the music track that the beat is contained within. For example, the bass line, high hat cymbal noises, or any other periodic component that can be characterised by its pitch and volume fluctuation, as found in all music.

For example, a low-pass filter set to attenuate frequencies above 80 Hertz is an effective way to isolate bass drumbeats. These typically occur on the first and third beats of a bar, or every beat, depending on the musical genre. Bass notes and other musical emphases that are predominant at low frequencies are also typically synchronised with beats in a bar.

In the same manner as above described, a band pass or high pass filter 112, for instance one set to emphasise frequencies above 4 KHz, can isolate and identify rhythms associated with eighth beats (quavers) in typical music, such as high hat cymbal patterns. Impulse response filters are again faster in this context than those that use spectrum analysis, and, moreover, generate data which is more directly applicable to beat and section detection, being a single value for any time of measurement corresponding to a contiguous range of frequencies.

Ideally, the frequency filters 112 are adjustable to allow the selected frequency and bandwidth to be moved/altered according to the music track selected, or even during the course of analysis to lock onto the most appropriate frequency range.

Figure 4:
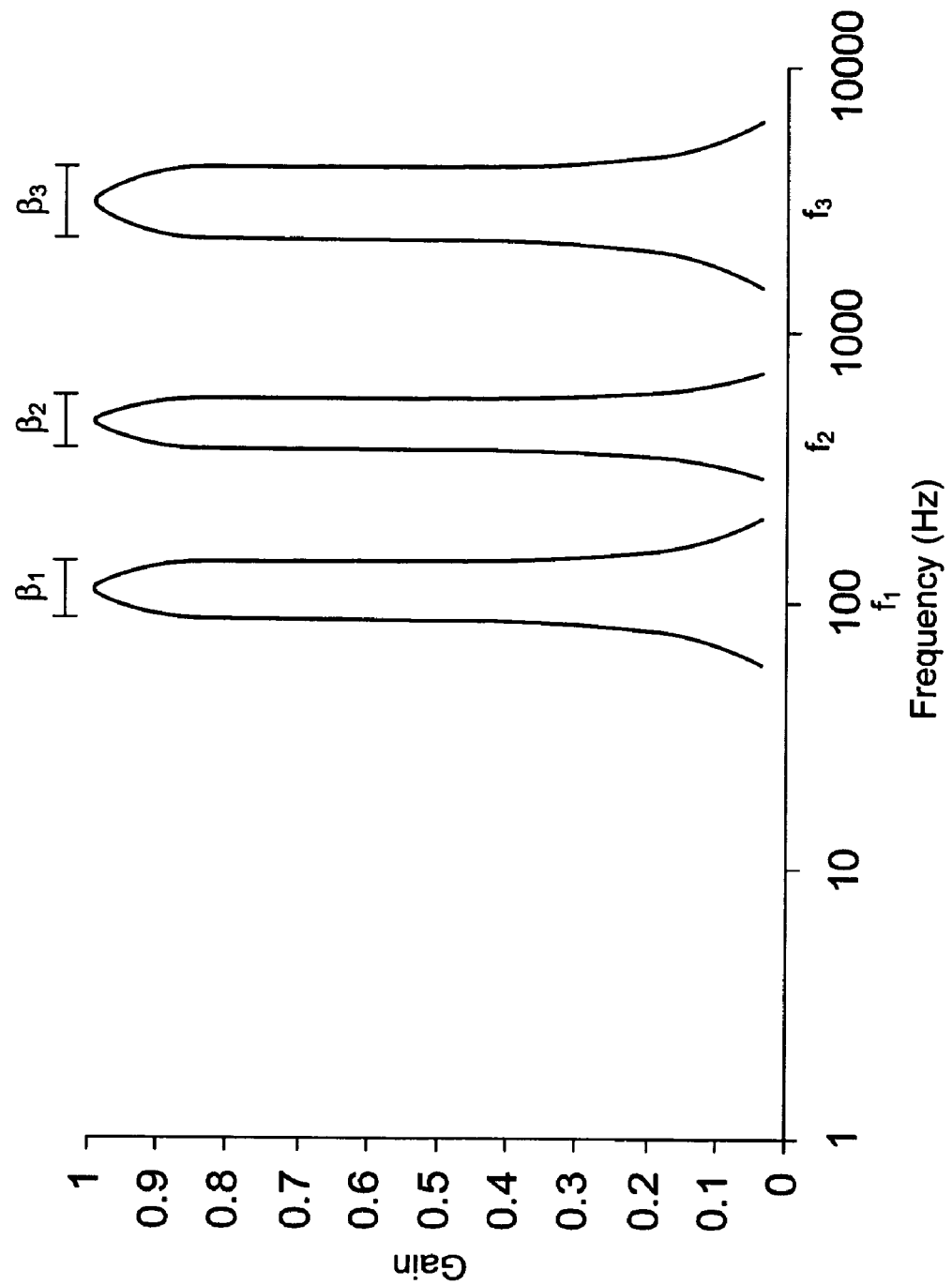
FIG. 4 shows a typical frequency response of the set of frequency filters of FIG. 3.

FIG. 4 shows an example of the response curves of three bandpass frequency filters 112, one with a centre frequency $f_1$ of 100 Hz, another centred on a frequency $f_2$ of 400 Hz and the last with a centre frequency $f_3$ of 3 kHz. They each have adjustable pass bandwidths of $\beta_1$, $\beta_2$ and $\beta_3$ respectively. In the preferred embodiment, these filters are infinite impulse response filters that enable arbitrarily adjustable frequency band positions (f1, f2 and f3 in FIG. 4) and bandwidths ($\beta_1$, $\beta_2$ and $\beta_3$ in FIG. 4). Infinite impulse response filters are preferred due to the ease in which the pass band may be selected, and their rapid and efficient implementation in software or suitable hardware. In this example, $\beta_3$ is wider than for the other two bands, as the Q factor of the filter is adjusted to make it pass a wider range of frequencies from the input signal; the optimal bandwidth $\beta$ and frequency f depends on the characteristics of the sounds the filter sets out to isolate.

The optimal filter frequency depends on the audio signal under analysis, and is determined by comparing the output of a multiplicity of filters 112 and resonators 113 which have been preset using data derived from an analysis of expected input. The initially chosen frequencies may then be adjusted later to produce more suitable results, dependent upon the expected period and regularity of output signals.

Filters designed around the impulse response technique of signal processing are preferable to spectrum analysis techniques (e.g. Fourier and Hartley transforms) because they have far more easily and accurately specified responses to low frequencies for a given computational effort. This results in the same performance at lower computation levels when compared to spectrum analysis methods.

Spectrum analysis only becomes appropriate when very large numbers of input bands are to be analysed, as the output for all bands is generated at once and can be selectively summed for input to many resonators. However, accurate bass resolution requires the computation of thousands of bands, including overlapping or 'windowing', to compensate for the lack of symmetry in sections of audio selected for fast spectrum analysis by the 'butterfly' optimisation techniques well known in the art. Windowing increases the computational expense of this approach, and is further compounded by the preference of embedded system hardware, such as game consoles and digital signal processors, to use a small data set in order to make best use of fast, but limited, local memory space.

The other part of the beat detector 111, the beat resonator 113, takes the output of the filter 112 and detects the dominant beat period of that portion of the music track. The period is a measure of the typical time between consecutive rhythmic events, or pulses, at the requisite frequency. The period is detected using the time between transitions of the slope of the filtered output, adjusting for the frequency-dependent delay associated with the filter 112. In some embodiments, each filter 112 may have a block of beat resonators 113 acting on the output of the filter 112, as shown for frequency filter f3 in FIG. 3.

Figure 5:
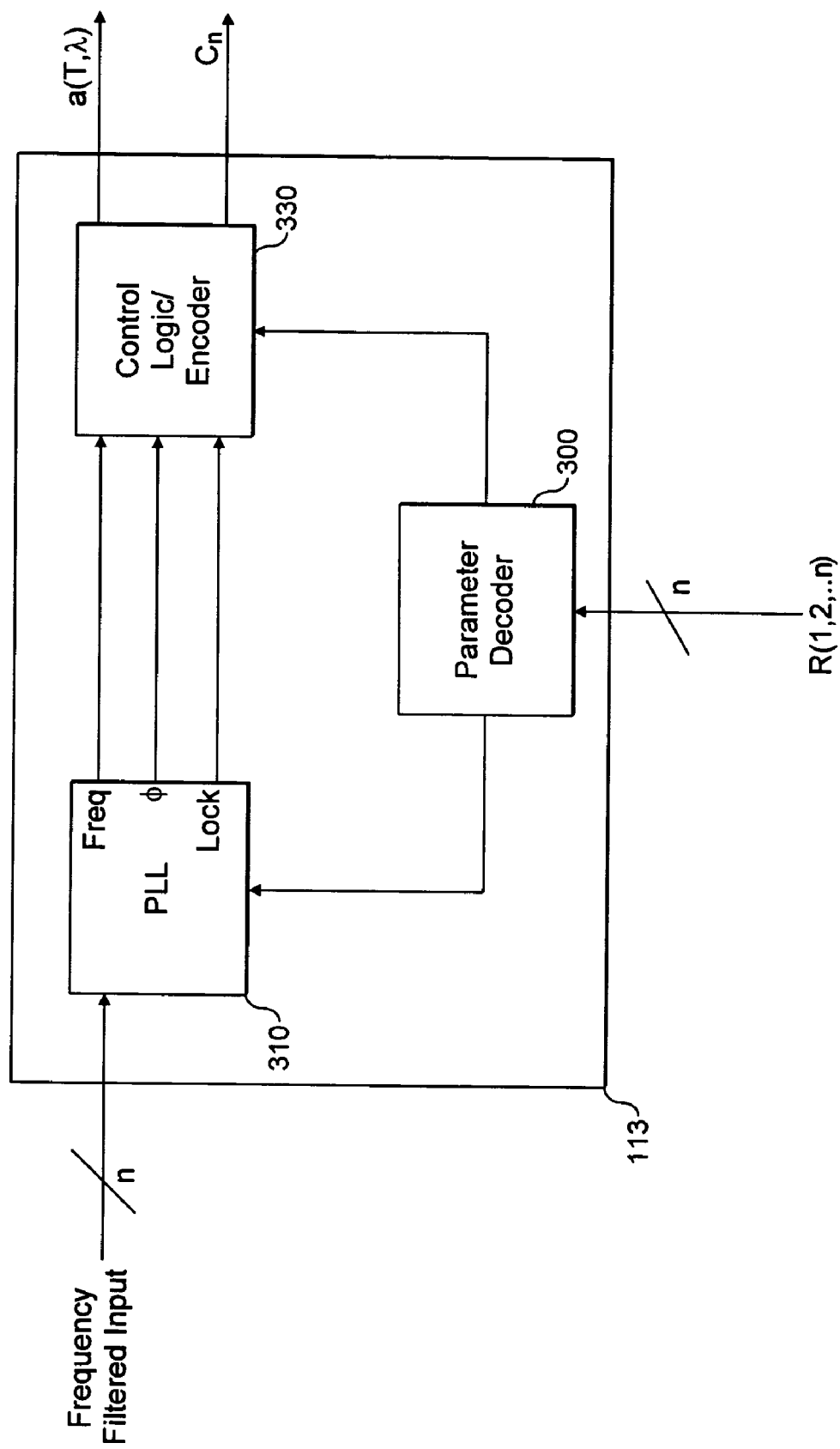
FIG. 5 shows a low level schematic of an example resonator.

In the preferred embodiment, the beat resonator 113 utilises a phase lock loop (PLL) 310 to detect the beat period. An example of a beat resonator 113 is shown in FIG. 5. The PLL 310 uses feedback to lock onto the dominant beat frequency. The period is then the reciprocal of the frequency. The PLL also outputs a phase value indicative of the phase difference between the currently locked on frequency and a reference frequency. The reference frequency can be a set frequency, the output from another of the beat resonators 113, a composite of such other beat resonator outputs, a pulse otherwise generated by the system, or even the player. It can also be a frequency that has been confidently detected by earlier analysis of the track.

The control parameters are derived from inputs from the dance controller 117, depicted as R(1, 2, . . . n) in FIG. 5. In such a system the control parameters R(1, 2, 3 .. n) set for each beat resonator may determine filter band frequencies and level thresholds, and the allowable drift in tempo and level for that resonator, corresponding to how specific it is to a given level or tempo and hence the rate at which deviation in those properties as measured by the resonator reduces the confidence output Cn. These are in turn derived from inputs received by the dance controller 117 from the Splitter 116, which distributes the outputs from the correlator 115. The outputs from the correlator 115 may include the direct outputs from each of the beat 113 and section resonators 114, which have bypassed the correlation operation, as well as the correlated data from these devices, and a confidence factor proportionate to the extent to which the input matches the period of the resonator in question, and which is inversely proportional to the feedback correction signal on a phase locked loop 310, for example.

These beat resonator parameters include the detection beat period to be used by a particular beat resonator 113, threshold levels and valid period ranges. An example of a typical beat period range for use in the beat resonators 113 is 0.8 to 0.4, which reflects a beat frequency range of 75 to 149 beats per minute. Threshold levels are a proportion of the total average volume of the track, which may be weighted according to Fletcher-Munson or similar equal loudness curves, to reflect perceived audibility.

The section resonators 114 use longer time measures, arithmetically related to those of the preceding beat resonators 113, in order to detect longer periods within the audio input, such as bars, pairs of bars and longer sequences to which dance or action data can be mapped by the sequence generator 260.

The section resonators 114 serve to identify periods of the audio signal input which match the length of sequences in the dance data, so that such periods can be used to make the dance or other expected input easier to learn and more closely correlated with the structure of the audio as experienced by the listener (i.e. by verse, chorus, etc). This is done by time and frequency analysis to identify the presence or absence of overdubs, or large volume variations in certain frequency ranges such as those associated with presence or absence of vocals, solos, or the like.

This may be done in real time, by building up a map of sections in the audio identified previously together with the cue sequence data generated for that section. Equally, this may be done by building a map of the sections in a fast initial pass over the audio and then assigning suitable cue sequences, of appropriate duration, for each section. The cue sequence, or dance, data may be new, or repeated if the current section is identified as being similar (or the same) to previously detected sections by the section resonators 114. The section maps of the music track are typically constructed using start and end timings and the correlated responses from multiple resonators 114. This may, for example, involve matching the onset signals from longer period resonators 114 with those of ones tuned to detect bar boundaries from the heavier initial beat or snare backbeat, biased to favour typical section lengths, e.g. an even number of bars long or typically a multiple of four or eight bars, by heuristics chosen to suit the expected audio.

By making a map of the track in memory as the beat analysis is performed, it is also possible to make a subsequent scan of the map to more reliably find sections in the music track. This would be typically done by detecting tonal balance variations, or similar, over period lengths of one or more bar lengths.

Tonal variations that denote sections are often applied differentially to left and right channels of a stereo track. Typically these are 'overdubs' panned to either side of the mix. Rather than process left and right channels separately to identify overdubs which commonly denote sections (e.g. a shaker panned to one side in a chorus, or a chord sequence known as a 'synth pad' used to fatten the sound within a section, or double-tracking of instruments either side, or panned backing vocals) it is most efficient to analyse just the difference of left and right stereo channels to get extra section cues, exploiting the way the stereo mix changes in typical tracks between introduction, verses and choruses. So some of the filter channels used in the map could be devoted to the channel delta rather than the mono sum filter outputs. The mono sum is still useful to detect vocal sections, changes in high hat patterns, and other data that only confuses beat analysis but remains a strong characteristic of sections. Preferably, both methods are used in conjunction with each other to add confidence to the result achieved.

The player is informed of the accuracy of his or her responses through the action of the Scoring System 45 which serves to correlate signals from the input device 50 with expectations generated by the Sequence Generator 260 and shown in advance on the Display Device 40, such that if a response is received as expected, the score is enhanced, in proportion to the accuracy of the timing of the response, and the player may be penalised or simply not rewarded if the signals from the input device 50 do not match the time or type of a required response.

The Scoring System 45 may trigger actions in the Audio post-processor 240 to augment or alter the audio track as delivered to the player to provide further feedback about relative success or failure, for instance by emphasising beats with extra sounds or audible filter effects or periodic adjustments to the stereo image. The cumulative score may also affect aspects of subsequent play, such as the availability of configuration options to the player, or the choice of expected responses so as to encourage a struggling player and reward an expert.

The control parameters R(1, 2, . . . n) are decoded by the parameter decoder 300, and are used to control the PLL 310 and control logic/encoder 330. The Lock output from the PLL 310 is proportional to the feedback signal in the PLL used to maintain the phase lock. This feedback is denoted by the word 'loop' in the phrase Phase Locked Loop. The output is proportional to the difference between the expected and predicted frequency, and hence allows the generation of a confidence-factor, as described below.

The control logic/encoder 330 takes the output of the PLL 30, and encodes the currently detected beat, its phase relative to the reference frequency and the below described confidence-factor, for output to the correlator 115. The control logic also includes divider/multipliers for use in dividing or multiplying the detected beat frequency, according to the control parameters, to keep their values within wanted ranges.

The beat resonator 113 also produces a confidence-factor output ($C_n$). The confidence-factor is a measure of the extent to which successive rhythmic components correlate with the currently detected period. Since music is written to a time signature, with beats in the music generally falling on the beat, or on subdivisions of the beat, with regular emphasis on certain beats, for example the first beat of the bar or the back beat (beats two and four in common time), the confidence-factor ($C_n$) is adjusted according to how well the currently detected frequency falls on this beat. For instance pulses at multiples or fractions of the period e.g. four times the period, corresponding to the first beat of a bar in common time, twice the period, corresponding to the down beat, or half the period (eighth or quaver beats) would boost the confidence factor, whilst irregular events or pulses not at such defined intervals will reduce it. The beat resonators 113 may also be pre-configured to detect or even ignore off beat pulses, depending upon how far they diverge from expected timing, should this be appropriate given the style of the music being used. This would typically require a pre-analysis of the music track in question, prior to the real-time detection of the beat. This pre-analysis method is described in more detail later.

The detected pulses at multiples of the beat period may have weights applied to give more control over how each of them effect the output of the beat resonators 113, for example, to allow specific beat resonators 113 to respond to common rhythms and time signatures such as waltz time (emphasising a multiple of three of the period, corresponding to three beats per bar) or one third or two thirds of the period (associated with triplet time). The number of beat resonators 113 and their weights is chosen to match properties of the anticipated signals. In "on-the-fly" implementations, the signals may be anticipated from what has been seen previously, however, in the case of the music track having been scanned fully prior to proper beat detection being carried out, the signals likely to be encountered are anticipated from this pre-scanned data.

The 'weight' is a scale factor (i.e. transfer function) relating any measure inferred by one part of the system to the output, or to later parts of the system. For instance a weight of 0 would make the measure irrelevant to the output, whilst higher weights increase the influence of the associated measure on the output.

The beat resonators 113 may also include components to halve or double the period information from the PLLs, in order to derive a regular pulse that falls within a defined range suitable for further use in selection and synchronisation of the cue sequences to the selected music track. For instance, dance step patterns might be defined presuming a rate of between 75 and 149 pulses per minute, whereas the music track has pulses occurring outside this range. Accordingly, such detected pulses are multiplied or divided until they fall within the desired range. For example, data from a beat resonator 113 generating fewer than 75 pulses per second might be progressively doubled until the information is in the presumed range. Likewise, the output of a beat resonator 113 generating more than 149 pulses of a second might be progressively halved in rate (doubled in period) to bring it into the expected range. This ensures a consistent density of events in the pattern, and prevents dance cue sequences being generated with beats that are too fast for a player to respond to.

By making use of a number of frequency filters 112 and beat resonators 113, beats occurring at different frequencies, and at different rates may be detected and utilised in the generation of the cue sequences for a particular music track. Beats with closely correlated frequencies combine to make predictions for the track more accurate, while those which are not in time with most of the others are ignored, according to the characteristic behaviour of a perceptron or neural network set to dynamically adjust weights to emphasise patterns in the input and sift out noise, in this case identified by low confidence factors and poor correlation with other detected beat frequencies.

The beats detected by the above described beat detectors 113 are all, at this stage, candidate beats only. This is to say, they are all beats that are to be found in the music track, however, to the human listener, some would not be considered the "main beat". Equally, some might be considered part of the "main beat", but are too fast for a player to be able to follow, therefore are not suitable for inclusion in the cue sequence for this particular music track at the selected difficulty level.

The present invention therefore makes use of an adaptive weighting system, or correlator 115. Correlation of the outputs of all the beat detectors 111, each comprising beat resonators 113 and frequency filters 112 variously configured, is carried out by means of a perceptron, neural net or similar adaptive weighting system.

Figure 6:
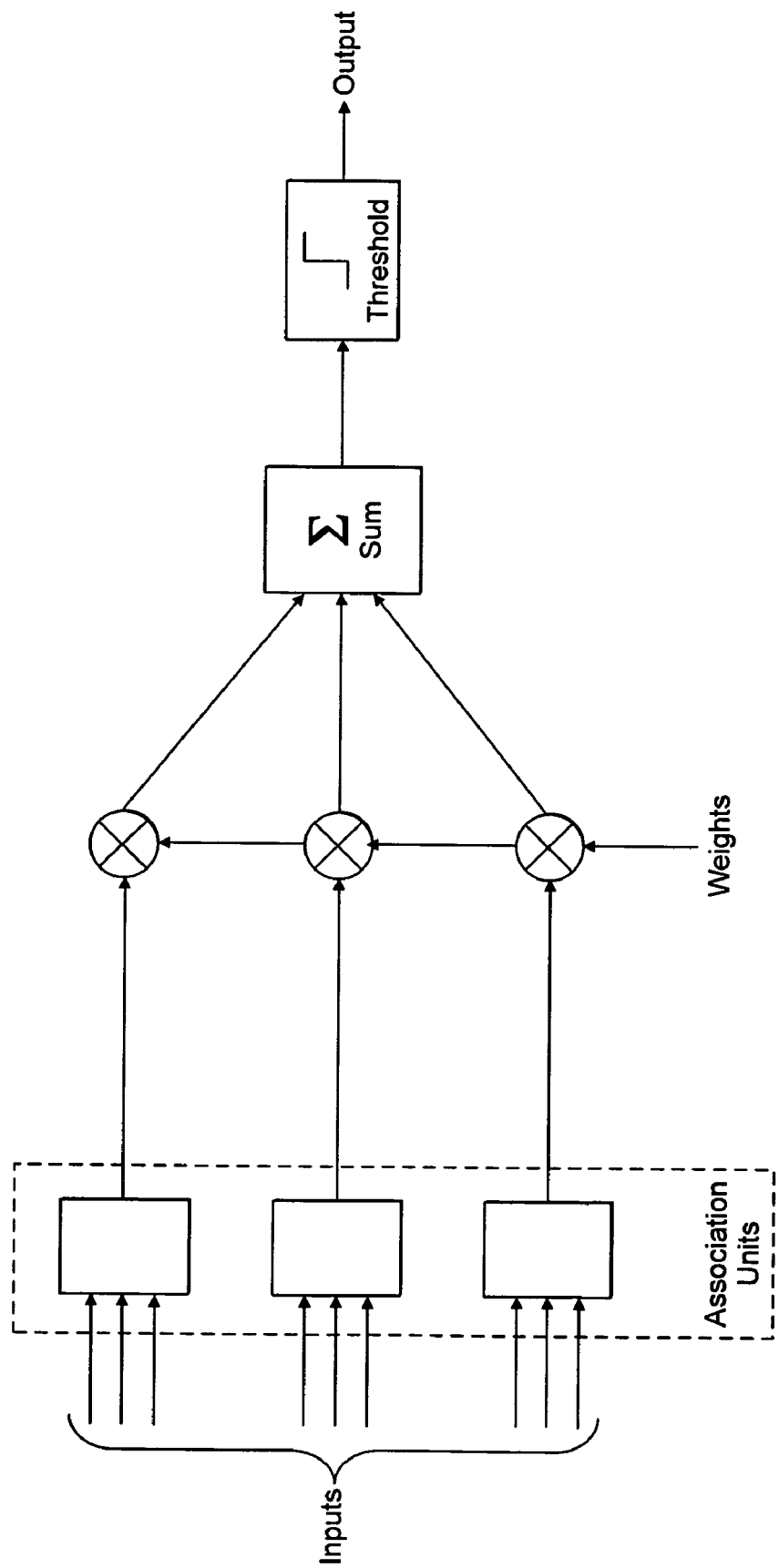
FIG. 6 shows an exemplarily embodiment of a correlator of FIG. 3.
Figure 7:
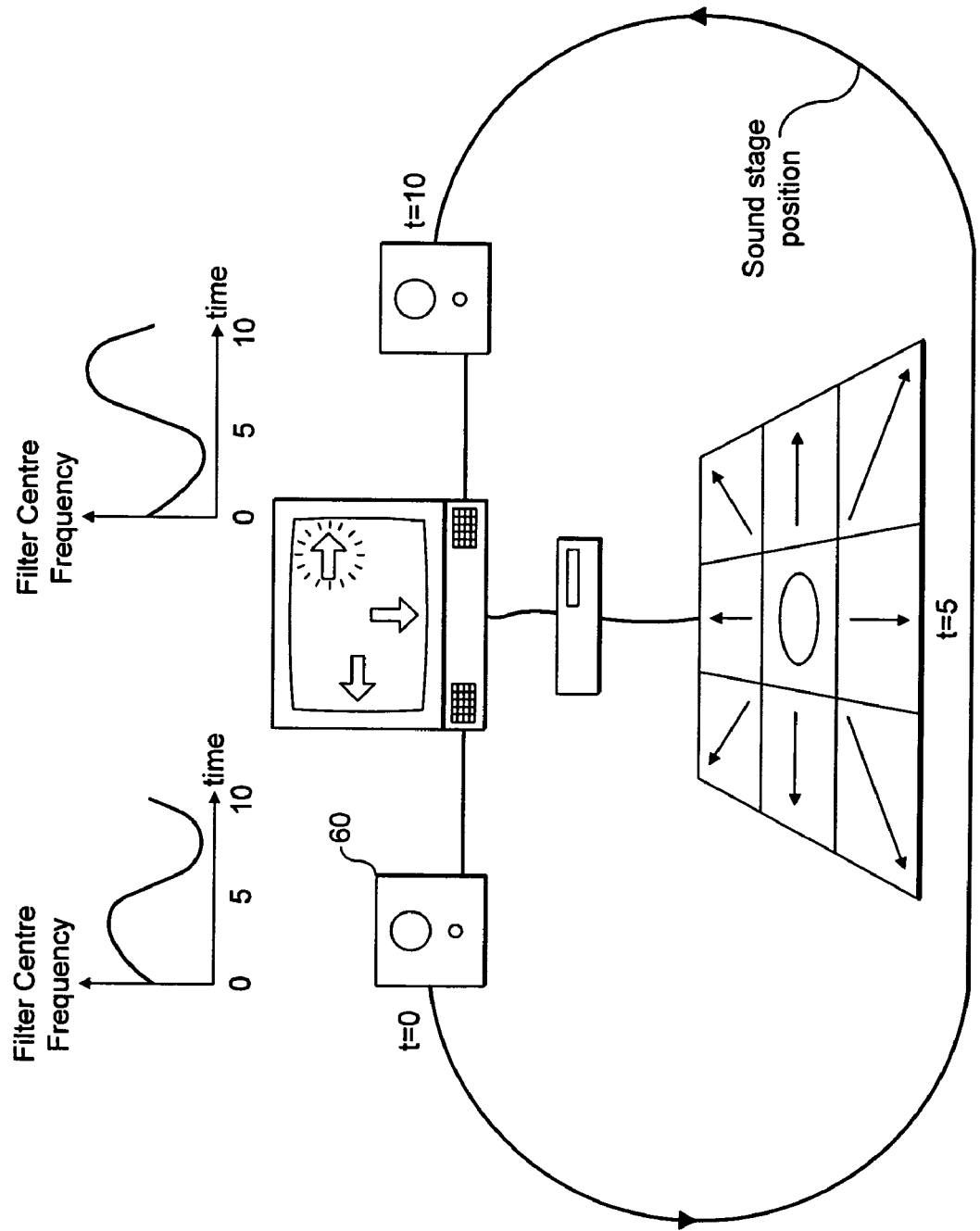
FIG. 7 shows one example of post-processing of an audio signal in time with the detected beats of the audio signal.

An example of a typical perceptron system, as used in the correlator 115, is shown in FIG. 6. The total output of the correlator 115 is a combination of a number of individual inputs to the correlator 115, including a beat periods, beat phases and confidence-factors, derived from the multiple inputs from the beat detectors 111 and section resonators 114. These inputs are combined after being, for example, statically or dynamically weighted to match expected utility. The static weight may be set by testing beat detectors 111 with various characteristics with a typical input. The dynamic weight may be derived from the confidence factor ($C_n$) computed on the fly, as previously described. Equally, the correlator 115 may make use of simpler rules, such as majority selection, or a combination of any number of different rules, applies in series, parallel or otherwise.

Figure 8:
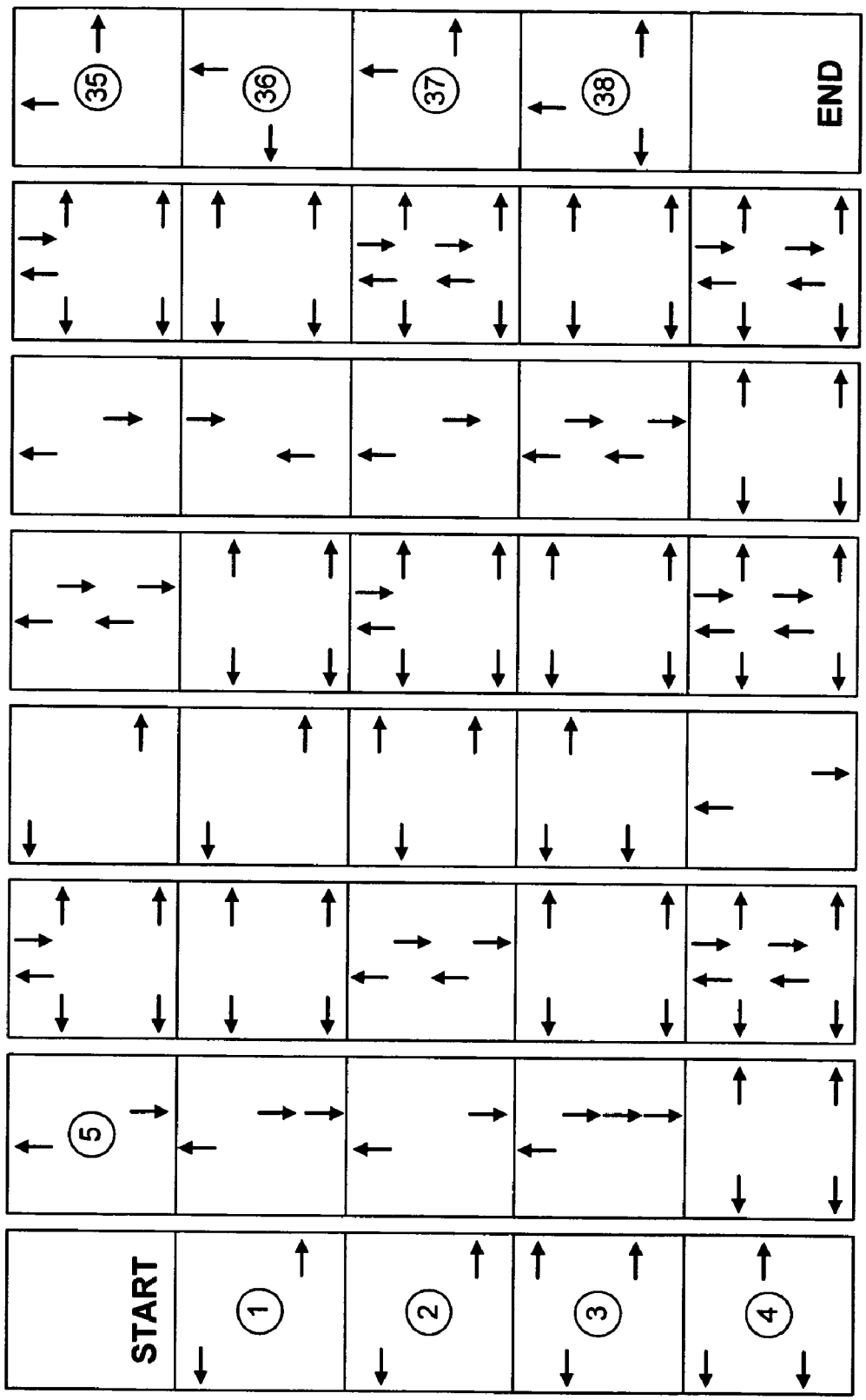
FIG. 8 shows examples of typical cue sequence patterns.

The outputs of the correlator 115,are used to synchronise pre-defined cue segments stored in memory into patterns that fall in time with the audio of the music track. Examples of the sort of pre-defined cue patterns include indications to press a particular directional key, or separate button, and are shown in FIG. 8. Each box corresponds to a bar of four beats. Each arrow corresponds to an expected step or other directional gesture associated with that direction and beat time. The number of subdivisions per bar, or possible gestures, and the combinations used, determine the skill needed to play the game. Patterns make the dance easier to learn, especially when they correspond to repeated patterns and changes of emphasis in the music.

Dance or similar input sequences are chosen from a database of pre-defined cues to reflect such things as the difficulty level indicated by the player, the computed tempo of the audio, the length of sections identified by analysis, and the relative strength of odd and even beats detected within a section.

In order to add variety without sacrificing repeatability, there will typically be more than one sequence that matches these parameters. When several candidate sequences match the parameters, one will be chosen using a pseudo-random method seeded by the unique characteristic calculated for the track, such that different characteristics typically yield different sequences even if selection parameters otherwise match.

Rather than build up sequences from single bar patterns, which would be varied but hard to learn, or provide ready made cue sequences to suit every length and structure of track, the cues for a track are compiled from sections chosen to match human gestures at the desired difficulty level and of durations typical of those found in sections expected in the audio genre used. Longer sections may be built up by concatenating such cue sections to the desired length, choosing them pseudo-randomly or from sets within the database.

The resultant cue sequence may also be associated with a music track map and stored in memory for later use.

Sections are contiguous parts of the input music track, such as the introduction, verse, chorus, middle 8, bridge, and finale of a song. Each section is, in terms of the beats that apply through out that section, quite distinct from other sections. In essence, each section will most likely require a separate dance cue pattern, and the music track as a whole might be thought of a combination of the cue patterns for each section. Section detection is used to select and place cue patterns in sequences that fit the current section of the song.

Section detection is carried out by section resonators 114, which are similar to the beat resonators 113, only they use much longer comparison periods. These section resonators 114 identify the changes in the confidence-factor outputs from the beat resonators 113, or other outputs from the beat detectors 111, or changes in the weighted average output of the frequency filters 112, consistent with the change of input associated with a section transition.

Sections are identified by their duration, start time and intensity, which are all derived from appropriate outputs from the beat resonators 113 or frequency filters 112 such as relative output level or tempo. This information is used, in conjunction with the unique identifying characteristic of the music media or music track, as described later, and indications from the user (in the form of menu or similar selections) to select appropriate predefined cue patterns held in the memory.

Whilst the above described beat detection may be carried out on-the-fly, in some cases, where the player decides that a more accurate dance is desired, the player may choose to carry out a pre-analysis of the music track or tracks. In particular, this pre-analysis aids the detection of sections, and allows the detection of the music type, for example, swing, jazz or electronic music.

Pre-analysis utilises the same basic method as the on-the-fly implementation, except that it is carried out at the limits of the media reading capability and/or processing capability of the computer hardware device 30, rather than in real-time. When using such pre-analysis, the results may be fed back to alter the parameters in control of the frequency filters 112, beat resonators 113, section resonators 114 and correlator 115. When pre-analysis is used, the data derived from the music to aid the beat detection and cue sequence generation may be stored in memory, and in particular a static memory 140, so that it may be re-loaded on re-insertion of the same music track source 20. Equally, even in on-the-fly implementations, the data from the first on-the-fly analysis can be stored in a similar manner. In this way, a first on-the-fly analysis may be considered a pre-analysis.

Depending on the complexity of the input and the required degree of accuracy in the required cue sequence, the pre-analysis may be performed more than once, with different initial parameters (e.g. for different time signatures, polyrhythms or genres of music) in order to trade time spent preparing the cue sequence against the perceived quality of the resultant dance. The decision to repeat the pre-analysis may be under the control of the player, tailored to suit the game mode, or influenced by the variability of the confidence factors generated during previous analyses. Low confidence factors, or a manual request to 'try harder', predispose the system to repeat the analysis. The number of times this may happen depends on the number of initial parameter sets with which the beat detector is furnished. Default parameters suit the majority of tracks chosen by the expected users. Additional sets accommodate other users and less common types of music.

If sufficient processing power is available, multiple parameter sets may be tested concurrently and the most confident results used thereafter, for all of or sections within a track.

In a preferred embodiment of the invention, the music track source 20, or the music track itself is analysed to produce a unique identification characteristic from properties of the source CD 20. This characteristic can then be stored, together with any data generated for that source, such as a dance cue sequence, and used to uniquely identify the source again when it is reloaded. By storing the data generated previously together with the characteristic, there is no need for another detailed re-analysis of the music source 20 on re-insertion.

The association between unique characteristics of the track and disc, and the generated data is potentially many to one, i.e. the same generated data might be associated with a number of unique characteristics. This might happen in the case where the same (or an audibly equivalent) track might come from several places, e.g. an album, single, compilation, MP3 file or network audio stream. Therefore, since the audio is equivalent, the recall of any set of 'previously derived data' could be appropriate for more than one unique characteristic. In this case, each unique characteristic will be associated with the generated data.

Generation of an unique characteristic for a particular music source 20 from its properties can be done in a number of ways, depending on what type of source is used and how long a determining period is desired. Shorter determination periods result from methods which do not require a traversal of the whole music track. For example, this might be the generation of a hash value, or checksum, computed from a Table of Contents and track number of a source music CD 20. The UPC/EAN catalogue number (bar code) from the mode 2 Q subcode words of a commercially mastered Compact Disc may also be used for this purpose.

An example where a traversal is required is to use a checksum of the audio samples or the data from which they are decoded (e.g. an MP3 file).

The above described characteristic may also be used to seed a pseudorandom number generator or otherwise to select a repeatable set of patterns when there are several suitable for the beat and sections identified.

Any dance cue sequence data pre-computed in the above way may be stored in static memory 130, thereby removing the need to repeat analysis.

Almost all music tracks currently available are released in at least stereo form, i.e. they contain at least two distinct audio channels. These two channels, whilst the same on both sides in the majority, are slightly different to provide the intended stereoscopic effects when the music is played back. These include panning of the beats between the channels, centring of the vocals in the stereo space, and the like.

Therefore, in embodiments of the present invention, the audio signal that is used by the beat detectors 111 may be pre-processed to optimise the beat detection. The pre-processing can take many different forms, however typical examples include down-mixing to a monaural combination audio signal, or subtracting channels to create a difference, or delta, audio signal. The delta signal has a particular benefit of removing the speech/lyrical component of the music in most cases, since the vocal part of a music track is more often than not equal on both left and right channels, therefore the subtraction process results in its cancellation. As described earlier, both the down-mixed mono signal, and the delta wave signal can also be used to detect sections within the selected music. The type of audio pre-processing may also be altered on the fly, to best suit the track in question.

Whilst the above is described in terms of two channels, with the advent of higher capacity storage devices, such as DVD-Audio, and better audio compression techniques, music is also being recorded and released with a greater number of discrete channels. The pre-processing may, therefore, make use of these additional channels, such as the pre-filtered sub-bass channel in a 5.1 channel surround mix.

Since, in the preferred embodiment, the rhythm action game is carried out using software, executing on suitable computer hardware 30, such as a console, and encoded to carry out the above described functions, there is the ability to setup an arbitrary number, or instances, of each of the different components of the system, such as the beat detectors 111.

The actual number of instances of each component will depend on the available resources, which in turn depends on the particular computer hardware 30 used. However, there is also the ability to vary the number of each component, for example beat detector 111, in time. This allows dynamic re-allocation of the resources during the analysis. Also, in the case of pre-analysis being used, there is less need to have section resonators 114 as well as beat detectors 111. This is because section analysis could have been fully performed already, with the start and end times relative to the track length now being known, i.e. already mapped. In this case, the resources that would otherwise be allocated to running the section resonators 114 are now free to carry out further filtering, or the like. However, section analysis may still be used if it is decided that the section changes are useful in generating the cue sequence. This might be in the case where sections are short and change rapidly.

Further embodiments of the invention may also make use of the data used to derive the cue sequences to control post-processing of the audio, in time with the detected beats. In the form of a game, the present invention seeks to test the player and reward that player for correct/accurate responses to dance cue sequences derived from the music track selected. This is typically in the form of points accompanied by graphics. However, this may also be in the form of amendment of the music itself.

The audio post-processing can make use of similar routines to those used in the pre-processing of the audio, to alter the audio before it is played out on the video and audio display device 40.

Whilst the range of audio effects that may be used is large, an example of one such audio effect is shown in FIG. 8. In this example, when a complex sequence is completed by the player with an above average accuracy, the left and right audio channels are band-pass filtered with frequency varying sinusoidally in opposite phase for left and right channels, so the left band falls as the right rises, and vice versa, therefore the audio sound stage perceived by the player will appear to circulate around the room. Similar techniques, such as Dolby Pro Logic™ encoding by phase switching to suit the required angle, can be employed in conjunction with a surround sound encoder to take advantage of any extra speakers, if present.

The invention claimed is:

1. A rhythm action game apparatus comprising:
   an audio analyser adapted to analyze a music track and provide corresponding rhythm data; and a sequence generator adapted to generate game play cues according to said rhythm data, wherein the audio analyser further comprises at least one beat detector, wherein each beat detector further comprises:

at least one frequency filter adapted to provide a filtered portion of said music track by isolating a corresponding predetermined frequency band of said music track; and a beat resonator adapted to detect beats within the filtered portion of the music track and to determine a beat period of the detected beats of the filtered portion of the music track, wherein the beat resonator is further adapted to detect a phase difference between the determined beat period and further successive detected beats within the filtered portion of the music track.

2. The apparatus of claim 1, further comprising an input device adapted to detect inputs from a user and a comparator, adapted to compare said input from a user with the generated cues for responses and provide an output dependent upon the difference between the two.

3. A computer readable storage medium comprising computer program code adapted to provide the apparatus of claim 1, when put into effect on a suitably equipped computer or game console.

4. A rhythm action game apparatus comprising:
an audio analyser adapted to analyze a music track and provide corresponding rhythm data; and
a sequence generator adapted to generate game play cues according to said rhythm data;
wherein the audio analyser further comprises at least one beat detector, wherein each beat detector further comprises:
at least one frequency filter adapted to provide a filtered portion of said music track by isolating a corresponding predetermined frequency band of said music track; and
a beat resonator adapted to detect beats within the filtered portion of the music track and to determine a beat period of the detected beats of the filtered portion of the music track, and wherein the beat resonator is further adapted to provide a confidence factor, said confidence factor being indicative of the correlation between the determined beat period and further successive detected beats within the filtered portion of the music track.

5. The apparatus of claim 4, wherein the beat resonator further comprises a phase locked loop.

6. A rhythm action game apparatus comprising:
an audio analyser adapted to analyze a music track and provide corresponding rhythm data, comprising:
a plurality of beat detectors comprising:
at least one frequency filter adapted to provide a filtered portion of said music track by isolating a predetermined frequency band of said music track; and
at least one beat resonator, the beat resonator adapted to detect beats within the filtered portion of the music track and to determine a beat period of the detected beats of the filtered portion of the music track, wherein the beat resonator is further adapted to provide a confidence factor, said confidence factor being indicative of the correlation between the determined beat period and further successive detected beats within the filtered portion of the music track;
at least one section detector, said section detector being adapted to detect discrete sections within the music track;
a sequence generator adapted to generate game play cues according to said rhythm data; and wherein the at least one section detector detects sections from the confidence factor of the at least one beat resonator.

7. A rhythm action game apparatus comprising:
an audio analyser adapted to analyze a music track and provide corresponding rhythm data comprising:
a plurality of beat detectors;
at least one section detector, said section detector being adapted to detect discrete section within the music track;
a correlator, adapted to provide a plurality of outputs for use in generating a dance or other sequence of cues for response, dependent upon weighted values of the outputs of the plurality of beat detectors and the at least one section detector;
a sequence generator adapted to generate game play cues according to said rhythm data; and
a dance controller, adapted to alter parameters of the at least one beat detector dependent upon the plurality of outputs from the correlator.

8. The apparatus of claim 7, further comprising a memory adapted to store predetermined dance data, and wherein the sequence generator generates cues for responses from said dance data stored in said memory according to said rhythm data.

9. A rhythm action game apparatus comprising:
an audio analyser adapted to analyze a music track and provide corresponding rhythm data, wherein the audio analyser further comprises at least one beat detector;
an audio pre-processor, adapted to process the music track prior to input into the at least one beat detector;
a sequence generator adapted to generate game play cues according to said rhythm data; and
wherein the audio pre-processor processes the music track to produce a delta wave output corresponding to the difference between a left and a right stereo channel of said music track.

10. A rhythm action game apparatus comprising:
an audio analyser adapted to analyze a music track and provide corresponding rhythm data; and
a sequence generator adapted to generate game play cues according to said rhythm data;
an input device adapted to detect inputs from a user;
a comparator, adapted to compare said input from a user with generated cues for responded and provide an output dependent upon the difference between the two; and
an audio post processor adapted to reconfigure the music track controlled by the rhythm data in response to the comparison of the input with the generated cues for responses, wherein the audio post processor filters left and right stereo channels to produce a rotating sound field.

11. A method of producing cues for responses in a rhythm action game, comprising:
analysing a music track to provide rhythm data corresponding to detected beats within the music;
generating a sequence of game play cues for response according to said rhythm data;
providing, for each of at least one frequency filters, a filtered portion of said music track by isolating a corresponding predetermined frequency band of said music track;
detecting beats within the filtered portion of the music track; and
determining a beat period of the detected beats of the filtered portion of the music track, further comprising detecting a phase difference between the determined beat period and further successive detected beats within the filtered portion of the music track.

12. The method of claim 11 further comprising detecting discrete sections within the music track.

13. The method of claim 12 wherein detecting discrete sections comprises detecting sections from a confidence factor of the at least one beat resonator.

14. The method of claim 12 further comprising correlating weighted values of the of detected beats and the at least one detected section to provide a plurality of outputs for use in generating a dance or other sequence of cues for response.

15. The method of claim 14 further comprising altering parameters of the at least one beat detector dependent upon the plurality of correlated outputs.

16. The method of claim 11 further comprising pre-processing the music track to produce a delta wave output corresponding to the difference between a left and a right stereo channel of said music track.

17. The method of claim 11 further comprising post processing to reconfigure the music track controlled by the rhythm data in response to the comparison of the input data with the generated cues for responses, wherein the audio post processing filters left and right stereo channels to produce a rotating sound field.

18. A computer readable storage medium carrying computer program code adapted to provide a rhythm action game upon execution on suitably equipped computer, comprising:
an audio analyser element, adapted to analyze a music track and provide corresponding rhythm data; and
a sequence generator element, adapted to generate game play cues according to said rhythm data, the audio analyzer element further comprising at least one beat detector, each beat detector further comprising:
at least one frequency filter adapted to provide a filtered portion of said music track by isolating a corresponding predetermined frequency band of said music track; and
a beat resonator adapted to detect beats within the filtered portion of the music track and to determine a beat period of the detected beats of the filtered portion of the music track, wherein the beat detector is further adapted to detect a phase difference between the determined beat period and further successive detected beats within the filtered portion of the music track.

19. The computer readable medium of claim 18 further comprising a correlator, adapted to provide a plurality of outputs for use in generating a dance or other sequence of cues for response, dependent upon weighted values of the outputs of the plurality of beat detectors and the at least one section detector.

20. The computer readable medium of claim 19 further comprising a dance controller, adapted to alter parameters of the at least one beat detector dependent upon the plurality of outputs from the correlator.

21. The computer readable medium of claim 18, wherein the audio analyzer element further comprises at least one beat detection component.

22. The computer readable medium of claim 21, wherein each beat detection element further comprises at least one frequency filter element, adapted to provide a filtered portion of said music track by isolating a predetermined frequency band of said music track.

23. The apparatus of claim 22, wherein the at least one frequency filter element is an Infinite Impulse Response filter.

24. The computer readable medium of claim 18 further comprising at least one section detector, said section detector being adapted to detect discrete sections within the music track.

25. The computer readable medium of claim 18 further comprising an audio pre-processor, adapted to process the music track prior to input into the at least one beat detector.

26. The computer readable medium of claim 18 further comprising an audio post processor adapted to reconfigure the music track controlled by the rhythm data in response to the comparison of the input data with the generated cues for responses.

* * * * *

UNITED STATES PATENT AND TRADEMARK OFFICE
CERTIFICATE OF CORRECTION

PATENT NO. : 7,528,315 B2
APPLICATION NO. : 11/417227
DATED : May 5, 2009
INVENTOR(S) : Simon Nicholas Goodwin It is certified that error appears in the above-identified patent and that said Letters Patent is hereby corrected as shown below:

Claim 10, Column 16, Line 45, "with generated cues for responded and provide" should read --with the generated cues for responses and provide--.

Claim 10, Column 16, Line 49, "comparison of the input with the" should read --comparison of the input data with the--.

Signed and Sealed this

Eighteenth Day of August, 2009

David J. Kappos
*Director of the United States Patent and Trademark Office*